United States Patent [19]

Clark et al.

[11] Patent Number: 5,405,573

[45] Date of Patent: * Apr. 11, 1995

[54] DIAMOND PELLETS AND SAW BLADE SEGMENTS MADE THEREWITH

[75] Inventors: Thomas J. Clark, Powell; Roger R. Matarrese, Upper Arlington; Roger W. McEachron, Worthington, all of Ohio; Sergio Sinigaglia, Brescia, Italy

[73] Assignee: General Electric Company, Worthington, Ohio

[*] Notice: The portion of the term of this patent subsequent to Sep. 1, 2009 has been disclaimed.

[21] Appl. No.: 857,192

[22] Filed: May 4, 1992

Related U.S. Application Data

[63] Continuation-in-part of Ser. No. 763,089, Sep. 20, 1991.

[51] Int. Cl.$^6$ ............................ B22F 3/10; B22F 7/04
[52] U.S. Cl. ................................. 419/35; 419/2; 419/14; 419/13; 428/548; 428/553; 428/558
[58] Field of Search .............. 51/206.4, 293, 295, 51/298; 148/403; 228/263.13; 419/35; 427/217; 428/667, 548, 553, 558

[56] References Cited

U.S. PATENT DOCUMENTS

| | | | |
|---|---|---|---|
| 3,316,073 | 4/1967 | Kelso | 51/309 |
| 4,448,618 | 5/1984 | Bose et al. | 148/403 |
| 4,461,811 | 7/1984 | Borneman et al. | 428/677 |
| 4,770,907 | 9/1988 | Kimura | 427/217 |
| 4,883,500 | 11/1989 | Deakins et al. | 51/298 |
| 5,143,523 | 9/1992 | Matarrese | 51/293 |

FOREIGN PATENT DOCUMENTS

| | | | |
|---|---|---|---|
| 0012631 | 6/1980 | European Pat. Off. | C09K 3/14 |
| 0264674 | 4/1988 | European Pat. Off. | C22C 26/00 |
| 0352811 | 1/1990 | European Pat. Off. | C22C 26/00 |
| 0493351 | 7/1992 | European Pat. Off. | C22C 26/00 |

*Primary Examiner*—Donald P. Walsh
*Assistant Examiner*—John N. Greaves

[57] ABSTRACT

The present invention addresses problems in the diamond saw blade and segment art. One aspect of the invention comprises a method for making handleable, strong, discrete, metal-clad abrasive pellets. This method comprises the steps of:

(a) spraying onto a bed of gas-fluidized abrasive particles a slurry of metallic powder, a binding agent, and a volatile solvent until substantially all the abrasive particles are coated with at least about 20 wt-% of the metallic powder;

(b) recovering the metal powder coated abrasive particles; and (c) heating said recovered coated particles under conditions to form a sintered continuous metal coating enveloping said abrasive particles. The resulting sintered metal-clad pellets form another aspect of the invention.

Another aspect of the invention comprises a method for making saw blade segments from metal-clad abrasive particles, comprising the steps of:

(a) placing a plurality of abrasive pellets, each comprising an abrasive particle coated with at least about 20 wt-% sintered metal, in a mold cavity; and (b) heating the contents of such mold cavity under conditions effective for forming an abrasive particle containing saw blade segment.

Preferably, the weight percent of abrasive in each pellet is from about 1 weight percent to about 10 weight percent and the metal coating weight percent ranges from about 99 weight percent to about 90 weight percent. Pellets devoid of abrasive particles; i.e., "dummy" pellets can be included in the mold cavity in order to regulate the concentration of abrasive particles in the saw blade segment.

10 Claims, 3 Drawing Sheets

DIAMOND PELLETS AND SAW BLADE SEGMENTS MADE THEREWITH

CROSS-REFERENCE TO RELATED APPLICATIONS

The present application is a continuation-in-part of application Ser. No. 07/763,089, filed Sep. 20, 1991. This application is cross-referenced to application Ser. No. 07/762,999, filed Sep. 20, 1991, the disclosure of which is expressly incorporated herein by reference.

BACKGROUND OF THE INVENTION

The present invention relates to abrasive grains, especially diamond grains, having thick, sinterable or sintered coatings thereon.

The present invention also relates to cutting tools such as wire saws and saw blades of the kind used for sawing hard and/or abrasive materials such as, for example, granite, marble, concrete, asphalt, and the like which are prepared from the thick, sinterable abrasive particles of the present invention.

U.S. Pat. No. 3,316,073 to Kelso, incorporated herein by reference, describes spherical abrasive bodies comprising a central abrasive particle surrounded by a matrix forming material. According to the '073 patent, the matrix material contains a sinterable material which upon application of heat will weld together to form a permanent strong bond for the abrasive particles. In some cases a temporary binder may be employed to make the pellets self-sustaining and strong enough to withstand handling prior to formation of the finished fired product. The bond volume to abrasive volume ratio is said to be at least 9 to 1. Such abrasive bodies may be sintered to form a finished tool.

U.S. Pat. No. 4,770,907 to Kimura, incorporated herein by reference, discloses a method of producing metal coated abrasive grains suitable for the manufacture of metal bonded diamond tools by the steps of initially preparing a slurry of metal powder with a solution of an agglomerating binder dissolved in an organic solvent, agitating the slurry to homogeneously suspend the metal powder therein, and spraying the slurry using an atomizing nozzle into a fluidized suspension of abrasive grains within a fluid bed granulator to progressively build and dry a uniform spherical coating of the slurry on each individual abrasive grain.

However, neither Kelso nor Kimura disclose or suggest the use of metal pellets devoid of abrasive grains in order to control the abrasive granule concentration in the finished tool. In the absence of such metal pellets devoid of abrasive grains; i.e., "dummy pellets," it would be necessary to provide a wide variety of coating thicknesses to be capable of varying the concentration of abrasive particles in the finished tool. Furthermore, Kelso neither discloses nor suggests sintering the coated abrasive grains prior to manufacture of the finished tool.

Conventionally, the cutting of hard materials such as, for example, granite, marble, filled concrete, asphalt and the like, has been achieved using rotary or circular diamond saws. The blade of saws of this type comprises a circular steel disk having a plurality of spaced segments about its cutting edge, which segments consist essentially of diamond abrasive bonded in a suitable alloy or metal matrix, such as bronze or cobalt, for example. The diamond abrasive typically is either a single crystal natural diamond or a single crystal manufactured diamond. U.S. Pat. No. 4,883,500 proposes the use of a combination of thermally stable polycrystalline diamond cutting elements and single crystal cutting elements dispersed in a bonding matrix.

A variety of problems have plagued the artisan in fabricating segments and saw blades containing such segments. For example, to optimize diamond saw blade performance, it would be desirable to prevent agglomeration of diamond in the metal bond powders during mixing and blending. This would permit maximum utilization of the diamond abrasive crystals. Further, it would be convenient to have controlled porosity within each segment to provide localized coolant during use, to minimize thermal degradation of diamond, and/or the bond metal.

In granite sawing with rotary saw blades, for example, lateral deflection of the blade as it enters harder areas of the stone can give rise to non-flat portions of the surface being cut. This leads to the need for expensive grinding and reduces the profit for the stone processor. One solution to this problem in the field has been to make sandwich segments with differential wear patterns to provide a matching track on the stone which reduces the chances of lateral blade deflection during the cut. Until now, the differential wear has been achieved by either varying concentration of the diamond across the face, or by adding wear resistant material in the outer portions of the segments, such as proposed in U.S. Pat. No. 4,883,500, cited above. These methods use the technique for filling the pressing cavity in three consecutive cold pressing steps, and then hot pressing to sinter the metal matrix powder in a separate operation.

It has been common practice for several decades to blend or mix diamond abrasive powders with fine metal powders to form segments by hot pressing in a sintering press. Air-borne fine metal powders, if toxic or carcinogenic, represent a potential health hazaed. In addition, differences in size, shape, and density between diamond and metal make production of homogeneous mixtures difficult. Also, it would be convenient to be able to automate mold loading.

BROAD STATEMENT OF THE INVENTION

The present invention addresses the foregoing problems and many more in the diamond saw blade and segment art. One aspect of the present invention comprises a method for making handleable, strong, discrete metal-clad abrasive particle pellets. This method comprises the steps of:

(a) spraying onto a bed of gas-fluidized abrasive particles a slurry of metallic powder, a binding agent, and a volatile solvent, for a time until each abrasive particle is substantially coated with said metallic powder;

(b) recovering said metal powder-coated abrasive particles substantially devoid of said volatile solvent; and (c) heating said recovered coated abrasive particles under conditions to form a sintered continuous metal coating enveloping said abrasive particles.

The resulting sintered metal-clad particle pellets form another aspect of the present invention.

Still another aspect of the present invention is a method for making saw blade segments which comprises:

(a) placing a plurality of abrasive pellets, each comprising an abrasive particle coated with at least about 20 wt-% sintered metal, and a source of braze metal in a mold cavity; and (b) heating the contents of such mold cavity under conditions comprising temperature and pressure to form an abrasive particle-containing metal saw blade segment. Optionally, such segments may contain interconnected porosity.

A further aspect of the present invention is a method for improving the sawing of substrates with saw blades having abrasive particle-containing metal saw blade segments having a lengthwise extent which follows the cutting edge of the saw blade. This method comprises:

(a) placing in a mold cavity a plurality of abrasive pellets, each pellet comprising an abrasive particle coated with at least about 20 wt-% metal, in an array of at least two rows parallel with the lengthwise extent of said segment, and a source of braze metal; and (b) forming said saw blade segment from said pellets and braze metal in said mold cavity. The saw blade retaining the segments forms at least a pair of furrows in a substrate being sawed therewith for stabilizing the blade during the sawing of said substrate.

Still another aspect of the present invention is a method for controlling the concentration of abrasive in tools by utilizing metal pellets devoid of abrasive grains; i.e., "dummy pellets." This method comprises:

(a) placing in a mold cavity a plurality of abrasive pellets, each comprising an abrasive particle coated with at least about 20 wt-% sintered or unsintered sinterable coating and an amount of dummy pellets effective for obtaining a desired abrasive concentration; and (b) exposing the contents of such mold cavity to conditions sufficient to form abrasive particle-containing tool.

Advantages of the present invention include the production of metal-clad abrasive pellets that can withstand the rigors of handling and processing as articles of commerce. Another advantage is the ability to produce relatively large pellets which provides additional degrees of freedom to the fabricator in the fabrication of metal saw blade segments and other tools. These and further advantages of the present invention will be readily apparent to those skilled in the art based upon the disclosure contained herein.

Figure 1:
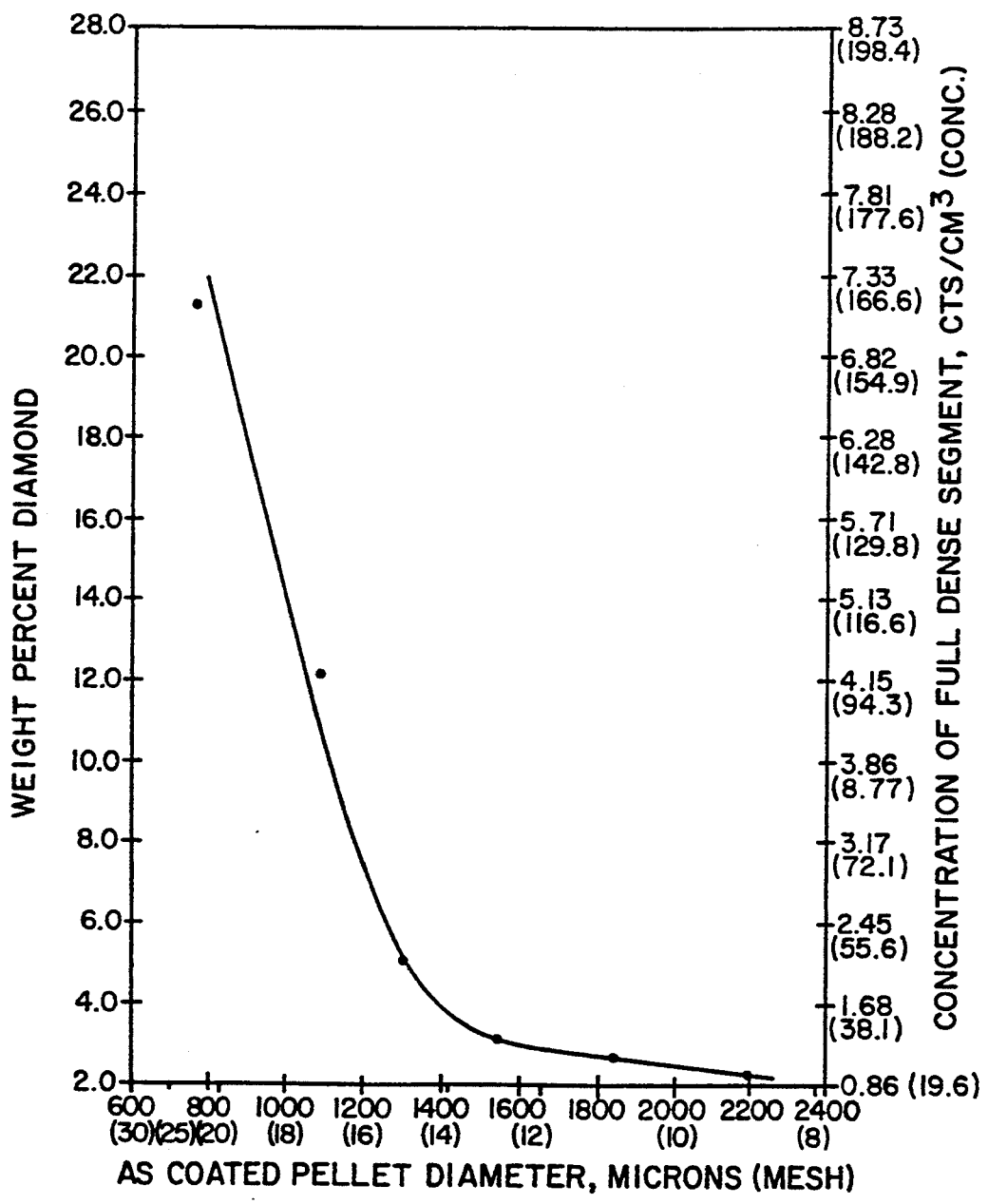
FIG. 1 displays the diamond content of the pellets by plotting the diamond content in weight percent and concentration in carats per cubic centimeter for 30/40 mesh diamond coated with cobalt versus the pellet diameter.

The figures will be described further below.

DETAILED DESCRIPTION OF THE INVENTION

In its broadest aspect, the present invention provides abrasive particles, most preferably diamond, having thick, sinterable coatings thereon. Such abrasive pellets can be sintered prior to use in the manufacture of finished tools; i.e. as "hard" pellets or balls, or they may be used in their unsintered state; i.e., as "soft" pellets or balls, in the manufacture of finished tools. When soft pellets are utilized in the tool manufacturing process, sintering is generally effected during a hot pressing step of the tool manufacturing process.

By sintering is meant heating the mass of pellets for a prolonged time below the melting point of the sinterable coating to cause agglomeration. Generally, such agglomeration also involves considerable densification of the sinterable coating. Sinterable materials include both metals and metal-containing or metallic materials such as alloys and cermets such as metal carbides and metal nitrides. The terms are used interchangably in the present specification.

Unsintered pellets or soft pellets made in accordance with the present invention generally contain from about 1 weight percent to about 10 weight percent diamond and from about 99 weight percent to about 90 weight percent sinterable coating material.

The preferred method for coating abrasive particles (e.g. diamond particles and cubic boron nitride particles) is described in U.S. Pat. No. 4,770,907, the disclosure of which is expressly incorporated herein by reference. Such coating method comprises the steps of preparing a slurry of metallic powder and a binding agent dissolved in an organic solvent, fluidizing a quantity of abrasive grains in a work vessel, and spraying the slurry into the vessel onto the abrasive grains during the fluidizing thereof for building and drawing a generally uniform coating of slurry on each of the abrasive grains. For practice of the present invention, however, use of aqueous binders is feasible and sometimes even preferred for certain metal powders. The '907 patent proposes the use of such as-coated abrasive particles in the formation of saw blade segments.

During the course of research leading to the present invention, it was determined that using such green (unsintered) abrasive particle pellets may result in breakdown of the pellets. In cases where green (unsintered) pellets are found to be too fragile for handling, sintering the green pellets to form a hard, dense coating may be required. Thus, while the basic coating process and machinery disclosed in the '907 patent are preferred for practice of the present invention, variation from such process as described herein is advantageous for maximizing the benefits of the present invention.

Accordingly, one aspect of the present invention is directed to a method for making handleable, strong, discrete metal-clad abrasive particle pellets. The initial steps of this process are conducted in accordance with U.S. Pat. No. 4,770,907, cited above, except that the binding agent can be dissolved in an aqueous or an organic solvent. In this regard, the binding agent may conveniently be thermoplastic in order that the binder set or become "cured" merely by the evaporation of the solvent which occurs concurrently during the pellet formation in the gas-fluidized bed of abrasive particles. Experience thus far has shown that glycerol dissolved in an alcohol such as ethanol or propanol is particularly effective as a binding agent. Fluidizing gas temperatures will not be too excessive lest special equipment and handling procedures be required. Thus, thermoset binders should be curable at relatively low temperatures, e.g. not above about 100° C.

The fluidizing gas conveniently comprises air for efficiency and economy, though inert or other gases may be used as is necessary, desirable, or convenient.

For example, non-oxidizing gases may be preferred should the metallic powder be sensitive to oxidation. As is taught in the '907 patent, the weight percent of coating adhering to the abrasive particles is a function of the time that the fluidized bed of particles is subjected to the slurry spraying operation. For present purposes, the proportion of metallic powder should be sufficient to completely coat the abrasive particles, which generally is at least 20 wt-% of the abrasive particles which are enveloped thereby. Such minimum metallic powder coating level ensures that each abrasive particle is coated or enveloped by the metallic powder. In this regard, it will be appreciated that for certain purposes, incomplete coating of the abrasive particles may be acceptable, though preferably each abrasive particle is entirely enveloped by a continuous metallic coating.

Experience to date has demonstrated that the sinterable coating should be, on a weight percent basis, at least 9 times that of the abrasive particle. Thus, the preferred range has been found to be from about 1 to about 10 weight percent abrasive and from about 99 to about 90 weight percent sinterable coating material. Of the various possible sinterable coatings, cobalt has been found to be particularly effective when applied via a cobalt in alcohol slurry. Any sufficiently volatile solvent can be substituted for the alcohol as its function is merely to keep the cobalt in suspension during the application process. Obviously, the process can be varied without departing from the spirit or scope of the invention, for example, by coating diamond abrasive particles with a carbide forming metal prior to application of a thick metal coating in the fluidized bed reactor.

The green abrasive particle pellets removed from the spraying operation will be substantially devoid of volatile solvent by virtue of the fluidizing gas drying thereof and will be essentially spherical in shape. Heating of the pellets can be practiced for removing additional solvent if required. Such green particle pellets are taught in the '907 patent as being appropriate for use in forming metal saw segments. However, for making handleable, strong, discrete metal-clad abrasive particle pellets that are capable of being shipped and handled in commerce in pellet form, the present invention, in one aspect, employs a heating step under conditions to form a sintered continuous metal coating enveloping the abrasive particles.

The sintering temperature and conditions necessarily depend on the particular metallic powder chosen for coating the abrasive particles. Conditions may include vacuum, and inert or reducing atmospheres being maintained during the sintering operation. The binding agent typically is removed during the sintering operation. In this regard, it will be appreciated that the size of the green pellets removed from the fluidizing operation necessarily depend upon the spraying time. Sintering of the green particles to form the sintered abrasive particle pellets of the present invention results in a reduction in pellet size due to the fusing of the powdered metal into a continuous metal coating. The degree of porosity, if any, in the metal coating also is determined by the metal powder particle size and sintering conditions. Such sintering conditions desirably are preclusive of melting of the metallic powder which would result in loss of particle discreteness. Sintering of cobalt coatings for about ten minutes at about 900° C. in a hydrogen (reducing) atmosphere has been found to be effective. The sintered pellets also will be essentially spherical if care is exercised during the sintering step of the process. Typical particle sizes will range from about 0.1 to about 2.4 mm.

Utilizing the relatively large sintered pellets of the present invention enable packing configurations in saw blade segment molds to be designed and maintained. It should be understood that this does not mean that the pellets must be patterned or ordered in their arrangement, although that is not precluded by the present invention. Rather, the pellets should be homogeneously distributed, i.e., semi-ordered, throughout the segment so that the pellets which contain diamond, as much as possible, function as single point cutting elements. By then controlling the pressure and temperature of formation of the saw blade segment, a designed degree of porosity can be achieved. In this regard, maintaining a higher pressure results in a fully dense saw blade segment. Insufficient pressure in formation results in insufficient integrity of the saw blade segment for achieving expected commercial life expectancies. Those skilled in the art will be able to determine without undue experimentation whether porous or non-porous segments function more effectively in given applications.

A braze overcoat may be employed for facilitating formation of saw blade segments from the abrasive pellets. Such braze coatings can envelope the pellets or braze metals can be placed adjacent to the packed mold for contributing to the formation of the saw blade segment. Suitable brazes comprise nickel-based filler metals, which preferably are AWS BNi-2 or BNi-6 filler metals (American Welding Society designations). Additional matrix metal powder can be used in forming the metal saw blade segments.

Regardless of the technique employed, an open cell structure, i.e., interconnected porosity can be achieved, particularly using the sintered metal-clad abrasive particle pellets of the present invention. The segments can contain from about 10% to 50% porosity (compared to a full dense segment). It will be appreciated that the size distribution of the pellets can be monomodal or can be polymodal depending upon the ultimate porosity requirements of the saw blade segment.

In the making of metal saw blade segments, another aspect in the application recognizes the need for controlling the abrasive particle concentration in the saw blade segment. Abrasive particle concentration can be controlled through variation of abrasive pellet size distribution or by the use of metal pellets, of the same or different size, which are devoid of abrasive particles (dummy pellets), or by a combination of these techniques. The remaining steps for formation of such metal saw blade segments are practiced in conventional fashion as those skilled in the art are well aware.

Alternatively, such metal saw blade segments of controlled concentration can be made by utilizing a combination of unsintered abrasive particle pellets and dummy pellets. Such combination of unsintered abrasive particle pellets and dummy balls can be placed in the desired form and sintered using conventional techniques. When practicing this aspect of the invention it is acceptable to use either sintered or unsintered dummy pellets.

Figure 2:
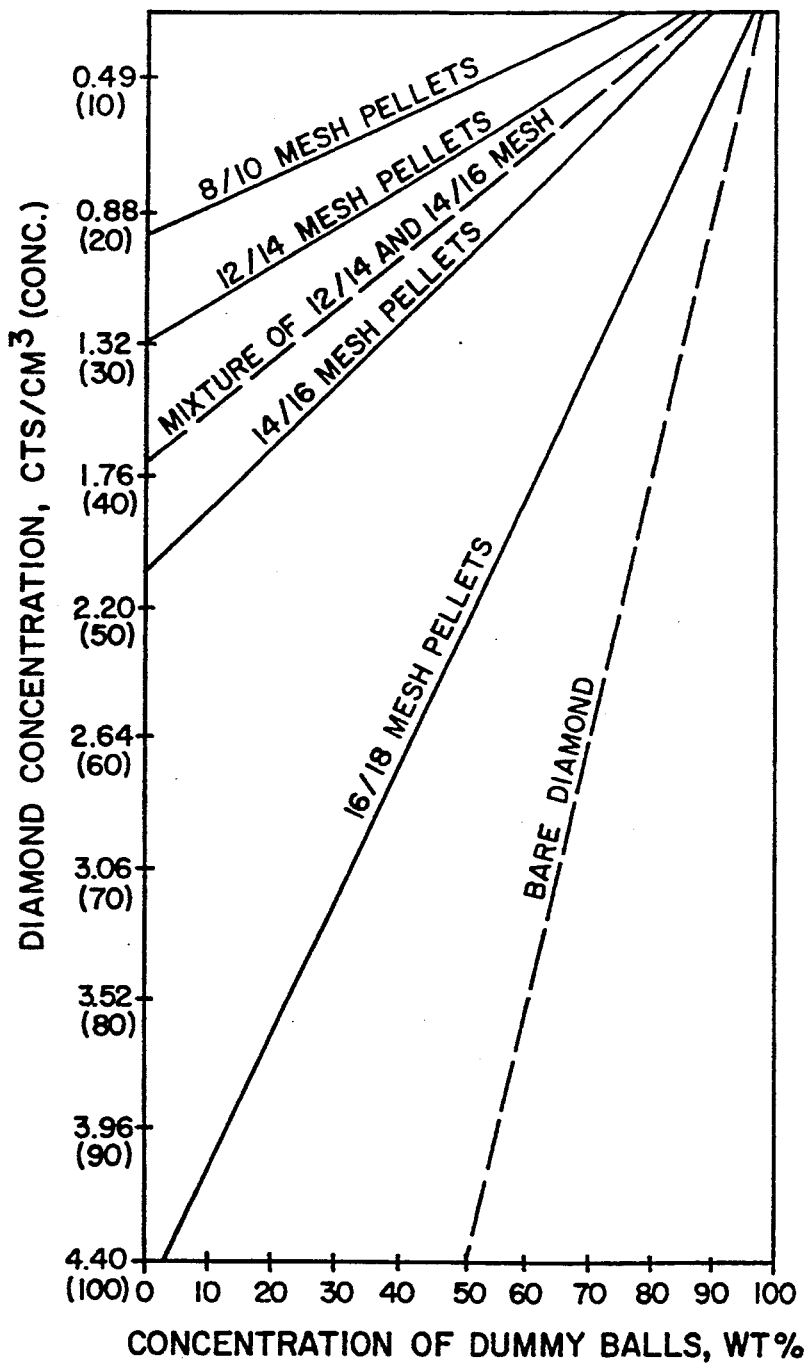
FIG. 2 displays the effect of mixing dummy balls with the diamond pellets of FIG. 1 by plotting the concentration of dummy balls versus the diamond concentration for various mesh sizes of diamond pellets.

In practicing a metal saw blade segment fabrication process, the diamond content for the pellet sizes of interest can be determined by standard assay procedure (e.g. dissolution of metal in acid). Based on the assay results, calculations of ultimate diamond content in the saw blade segment can be made, assuming full densification. The resultant data can be plotted showing the relationship between diamond content and size of the pellets for any given diamond size. Diamond content can be displayed as weight percent as well as carats per unit volume of the segment as shown in FIG. 1. This example is for 30/40 mesh diamond coated with cobalt. The effect of mixing dummy pellets or balls (sans diamond) with monosized abrasive pellets additionally can be plotted as shown in FIG. 2. The mesh size necessary to achieve any diamond concentration can be determined from such a graph. When mixing monosized pellets with dummy balls, the graph also can be used to determine relative proportions needed for a given concentration. When mixing pellets of different mesh sizes, the simple rule of mixtures can be used to calculate the proportion of each size needed to achieve a given concentration, or assays of the mixture also can be performed to determine the actual diamond content. The resultant value of diamond concentration then can be located on one axis of the graph at zero concentration of dummy balls. By drawing a straight line from this point to the point representing 100% dummy ball concentration and zero percent diamond concentration, the subject mixture can be represented (e.g., the mixture of 12/14 and 14/16 mesh pellets shown in FIG. 2). From this line, any diamond concentration within the limits of the plotted line can be achieved by mixing with an appropriate amount of dummy balls, as indicated on the appropriate axis of the graph.

As described in U.S. Pat. No. 4,883,500, differential wear is important in fabricating saw blades that are resistant to lateral deflection during the sawing of, for example, granite. Varying the concentration of the diamond across the face or adding wear resistant material in the outer portions of segments have been proposed in the art for achieving such effect, such as shown at FIG. 2 of the '500 patent.

Figure 3:
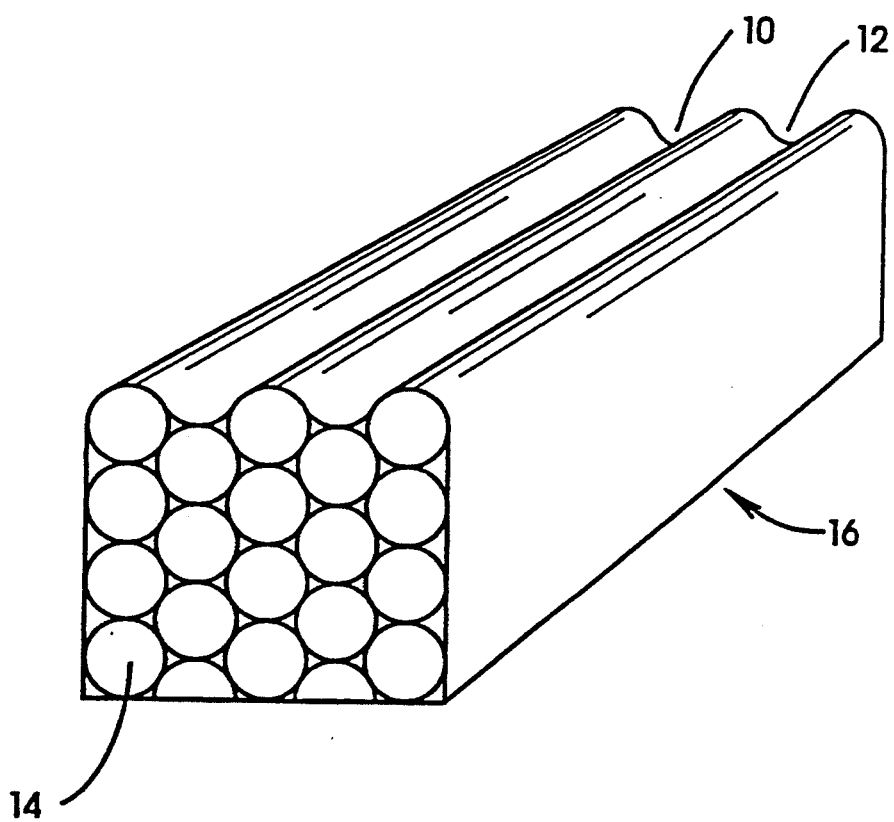
FIG. 3 is a perspective view of a saw blade segment made with an array of the novel sintered pellets showing the furrow pattern that develops on its cutting edge with sawing a substrate with a saw blade containing such segment.

Unexpectedly, development work on the present invention revealed that saw blade segments made with the pellets of the present invention can achieve such a cutting pattern. While such cutting pattern can be attributed to providing a higher diamond or other abrasive particle concentration at the periphery of the saw blade segment (e.g. using the dummy balls and a higher proportion in the center of the saw blade segment), full dense segments have shown this "tracking" effect without special abrasive particle gradients being established. Long, parallel furrows are developed as a result of ordered rows of diamond in the segments. Ordering is a result of close packing of spherical pellets in the mold. The wear pattern develops as shown in FIG. 3, where furrows 10 and 12 are formed from the array of pellets 14 of saw blade segment 16. Such a differential wear pattern results in a matching and interlocking surface in the stone being cut which aids in suppressing lateral deflection of the blade during sawing operations. Depending upon the width of the saw blade and the size of the abrasive pellets, an array of a multitude of rows parallel with the lengthwise extent of the segment, and hence the cutting edge of the saw blade, can be achieved readily with resultant tracking achieved thereby. It will be appreciated that such segments may contain porosity or be fully dense.

The sinterable coating applied to the abrasive particle may be a metal, an alloy or a cermet. Thus, the metals used in coating the diamond, cubic boron nitride, or other abrasive particles can be selected from a wide variety of metals, including alloys and metal carbides already used in the abrasives art. Such metals include, for example, cobalt, nickel, iron, copper, tin, molybdenum, boron, titanium, tungsten, tantalum, chromium, vanadium, manganese, niobium, zirconium, hafnium, and the like, and alloys, carbides, nitrides, and mixtures thereof.

Segments manufactured in accordance with the novel sintered pellets of the present invention are adaptable for use in deep sawing applications, slabbing operations, cut-off operations, frame sawing, multi-blade sawing, wire sawing, belt saws, thin wall core drilling, and various contour and shaping operations. Materials which can be cut with segments of the present invention include concrete, filled concrete, reinforced concrete, asphalt, marble, granite, limestone, sandstone, wood, metals, plastics, composites and the like.

A wide variety of saw blade segment designs are known in the art and are useful, such as, for example, disclosed in U.S. Pat. No. 4,883,500. Other variations, modifications, and rearrangements may be made to the present invention without departing from the spirit or intended scope of the present invention.

EXAMPLES

In the following examples, tests were conducted to determine the effectiveness of saw blades manufactured in accordance with the present invention. In each example, the segments were manufactured from sintered, or hard pellets and the segments contained varying concentrations of dummy pellets.

Example 1

A saw blade of 1000 mm diameter was prepared in which the cutting elements were 30/40 mesh MBS-760C diamond (available from General Electric Company) having a sintered cobalt/tungsten/tin coating thereon which was applied by a fluidized bed method. Sintering was effected by heating at about 900° C. in a hydrogen atmosphere for about 10 minutes. The weight percent of metal coating to diamond was approximately 95 wt-% metal coating and 5 wt-% diamond. In the segments of the finished tool, dummy balls were used to adjust the diamond concentration to about 17.8 (0.75 cts/cc). The segments were brazed to the saw blade core in a conventional manner.

The thus prepared saw blade was used to cut a granite sample. The wear rate was very low despite cutting at approximately three times the normal cutting rate. The wear pattern of the segments suggested that the diamond concentration was greater than necessary to achieve effective sawing in this sample.

Example 2

A saw blade of 350 mm diameter was prepared in which the cutting elements were 50/60 mesh MBS 750 diamond (available from General Electric Company) having a sintered cobalt/tungsten/tin coating thereon. The coating was prepared in the same manner as described in Example 1 and was in approximately the same metal to diamond ratio. In the segments of the finished tool, dummy balls were used to adjust the diamond concentration to about 21.4 (0.90 cts/cc). The segments were brazed to the saw blade core in a conventional manner.

The thus prepared saw blade was used to cut granite. The saw blade had a projected life of 10% greater than a conventional blade despite blade rounding due to an overabundance of cutting elements. Saw blade "tracking" was evident, resulting in a straight cut.

Example 3

Six saw blades of 1000 mm diameter were prepared in which the cutting elements were 30/40 mesh MBS-760C diamond and 60/70 mesh MBS-760C diamond having a sintered cobalt/tungsten/tin coating thereon. The segments were prepared such that the 30/40 mesh diamond was at the center section of the segments and the 60/70 mesh diamond was at the outer edges of the segments. Such segments are known in the art as sandwich segments. The coating was prepared in the same manner as described in Example 1 and was in approximately the same metal to diamond ratio. In the segments of the finished tool, dummy balls were used to adjust the diamond concentration to about 22 (0.95 cts/cc). The segments were brazed to the saw blade core in a conventional manner.

The thus prepared saw blades were utilized in a multi-blade saw to cut granite. The saw blades had a projected life of approximately twice that of conventional diamond saw blades in cutting the granite.

Example 4

A saw blade of 1000 mm diameter was prepared in which the cutting elements were 30/40 mesh MBS-750 diamond having a sintered cobalt coating thereon. The coating was prepared in the same manner as in Example 1 and was in approximately the same metal to diamond ratio. In the segments of the finished tool, dummy balls were used to adjust the diamond concentration to about 26 (1.1 cts/cc). The segments were brazed to the saw blade core in a conventional manner.

The thus prepared saw blade was used to cut marble. After cutting about 800 square meters of marble the blade began to polish, suggesting that the diamond concentration was too high.

Example 5

A saw blade of 1000 mm diameter was prepared in which the cutting elements were 30/40 mesh MBS-750 diamond having a sintered cobalt coating thereon. The coating was prepared in the same manner as in Example 1 and was in approximately the same metal to diamond ratio. In the segments of the finished tool, dummy balls were used to adjust the diamond concentration to about 26 (1.1 cts/cc). The segments were brazed to the saw blade core in a conventional manner.

The thus prepared saw blade was used to cut marble. The saw blade had a projected life of three to four times that of a conventional diamond saw blade in cutting marble.

We claim:

1. A method for making abrasive particle pellets comprising the steps:
   (a) spraying onto a bed of moving abrasive particles a slurry of metallic powder until substantially all of the abrasive particles are coated with at least about 20 wt-% of said metallic powder;
   (b) recovering from step (a) substantially spherical metal powder coated abrasive particles; and
   (c) heating said recovered coated abrasive particles under conditions to form pellets having a sintered continuous metal coating enveloping said abrasive particles.

2. An abrasive particle-containing metal saw blade segment which contains a semi-ordered array of spaced-apart abrasive pellets, said pellets comprising an abrasive particle substantially coated with sintered metal.

3. The segment of claim 2 wherein said metal is selected from cobalt, nickel, iron, copper, tin, molybdenum, boron, titanium, tungsten, chromium, vandadium, manganese, niobium, zirconium, hafnium, and alloys, carbides, and mixtures thereof.

4. The segment of claim 3 which contains porosity which ranges from about 10% to 50% of full density.

5. The segment of claim 4 wherein said abrasive particles are one or more of diamond or cubic boron nitride (CBN).

6. A method for improving the sawing of substrates with saw blades retaining abrasive particle-containing metal saw blade segments having a lengthwise extent which follows the cutting edge of said saw blade, which comprises the steps of:
   (a) placing in a mold cavity a plurality of abrasive pellets, each
   comprising an abrasive particle coated with an least about 20 wt-% metal, in an array of at least two rows parallel with the lengthwise extent of said segment, and a source of braze metal; and
   (b) forming said saw blade segment from said pellets and a braze metal in said mold cavity, a saw blade retaining said segments forming at least a pair of furrows in a substrate being sawed therewith for stabilizing said blade during said sawing of said substrate.

7. The method of claim 6 wherein said abrasive particles are selected from diamond particles and cubic boron nitride (CBN) particles.

8. The method of claim 6 wherein said metal coating is selected from cobalt, nickel, iron, copper, tin, molybdenum, boron, titanium, tungsten, chromium, vanadium, manganese, niobium, zirconium, hafnium, and alloys, carbides, and mixtures thereof.

9. The method of claim 6 wherein said segment contains porosity which ranges from about 10% to 50% of full density.

10. The method of claim 6 wherein said coated abrasive particles contain an overcoat of braze metal.

* * * * *